United States Patent
Gis et al.

(10) Patent No.: US 11,589,139 B2
(45) Date of Patent: Feb. 21, 2023

(54) METHOD FOR CHECKING, EVALUATION, AND/OR ERROR DIAGNOSIS OF A SENSOR SYSTEM, SENSOR SYSTEM, AND SYSTEM

(71) Applicant: Robert Bosch GmbH, Stuttgart (DE)

(72) Inventors: Daniel Gis, Rostock (DE); Christian Haubelt, Kritzmow (DE); Nils Buescher, Rostock (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/448,099

(22) Filed: Sep. 20, 2021

(65) Prior Publication Data
US 2022/0095022 A1 Mar. 24, 2022

(30) Foreign Application Priority Data

Sep. 22, 2020 (DE) .......................... 102020211821.3
Jan. 13, 2021 (DE) .......................... 102021200244.7

(51) Int. Cl.
*H04Q 9/00* (2006.01)
(52) U.S. Cl.
CPC ........... *H04Q 9/00* (2013.01); *H04Q 2209/86* (2013.01)
(58) Field of Classification Search
CPC .................. H04Q 9/00; H04Q 2209/86
See application file for complete search history.

(56) References Cited

U.S. PATENT DOCUMENTS 7,961,651 B2 * 6/2011 Kim .................. H04W 40/32
370/328

FOREIGN PATENT DOCUMENTS

CN 103048087 A * 4/2013
DE 102018103969 A1 8/2019
EP 3404898 A1 * 11/2018 ............. H04L 67/12

OTHER PUBLICATIONS

Wen et al., "A New Quaternion Kalman Filter Based Foot-Mounted IMU and UWB Tightly-Coupled Method for Indoor Pedestrian Navigation," IEEE Transactions on Vehicular Technology, 2020, vol. 69, No. 4, pp. 4340-4352.
Koch et al., "A Recurrent Neural Network for Hand Gesture Recognition Based on Accelerometer Data," 41st Annual International Conference of the IEEE Engineering in Medicine and Biology Society (EMBC), 2019, pp. 1-5. <https://kar.kent.ac.uk/73782/1/EMBC19_1764_FI.pdf> Downloaded Sep. 16, 2021.

(Continued)

*Primary Examiner* — Franklin D Balseca
(74) *Attorney, Agent, or Firm* — Norton Rose Fulbright US LLP; Gerard Messina

(57) ABSTRACT

A method for checking, evaluation, and/or error diagnosis of a sensor system. The sensor system includes at least one sensor unit and an internal data processing unit. The sensor unit outputs sensor data as a function of a physical stimulus and the internal data processing unit is configured to process the sensor data output by the sensor unit to form output data. The sensor data output by the sensor unit is read out from the sensor system and recorded by an external processor unit in a recording step. The recorded sensor data are fed by the external processor unit into the internal data processing unit in an injection step. The fed-in sensor data are processed by the internal data processing unit in a processing step.
A sensor system, and a system made up of a sensor system and a processor unit are also described.

13 Claims, 5 Drawing Sheets

(56) References Cited

OTHER PUBLICATIONS

Koksal et al., "Adaptive Linear Quadratic Attitude Tracking Control of a Quadrotor UAV Based on IMU Sensor Data Fusion," Sensors, 2019, vol. 19, No. 1, pp. 1-23. <https://www.mdpi.com/1424-8220/19/1/46> Downloaded Sep. 16, 2021.

Solanki et al., "Inertial MEMS Test Challenges," 2011 IEEE 17th International Mixed-Signals, Sensorsand Systems Test Workshop, 2011, pp. 114-119.

Rudolf et al., "System Power Profiling for IoT Device Firmware Using Runtime Configurable Models," 2019 8th Mediterranean Conference On Embedded Computing (MECO), 2019, pp. 1-6.

Krishnan et al., "Digital Sensor Simulation Framework for Hardware-in-the-Loop Testing," 2017 International Conference on Intelligent Computing, Instrumentation and Control Technologies (ICICICT), IEEE, 2017, pp. 1-5.

\* cited by examiner

METHOD FOR CHECKING, EVALUATION, AND/OR ERROR DIAGNOSIS OF A SENSOR SYSTEM, SENSOR SYSTEM, AND SYSTEM

CROSS REFERENCE

The present application claims the benefit under 35 U.S.C. § 119 of German Patent Application Nos. DE 102020211821.3 filed on Sep. 22, 2020, and DE 102021200244.7 filed on Jan. 13, 2021, which are both expressly incorporated herein in their entireties.

FIELD

The present invention is directed to a method for checking, evaluation, and/or error diagnosis of a sensor system.

BACKGROUND INFORMATION

Intelligent inertial sensors are available in the related art, in which developers may implement sensor fusion or tasks such as gesture recognition directly in the sensor hardware, by which a reduction of the processing latency and the energy consumption is achieved. The development of software for intelligent inertial sensors causes some difficulties due to the limited hardware capabilities of the microcontroller (µC) and the absence of the possibilities of executing reproducible tests directly on the hardware. Inertial sensors are typically used for a variety of different devices for a broad spectrum of applications from step recognition [1] via gesture recognition [2] to autonomously driving or unmanned aircraft (UAVs) [3]. To enable this, the modern inertial sensors are capable of carrying out the filtering and preprocessing of the detected data directly on the sensor before these data are used and processed by the system. For safety-critical systems in particular it is crucial that the entire sensor system including the inertial sensors is assessed according to all possible aspects, including its physical properties [4]. This also includes the preprocessing of the data directly on the inertial sensor and the behavior of the applications which use these data. Two methods are used in particular for the evaluation. The first method is the use of virtual prototypes, the actual hardware being simulated by a software model [5]. This method enables reproducible results and may be programmed to simulate all possible scenarios. However, a very detailed virtual prototype may become too computationally intensive to be executed in real time and therefore will require significantly longer for the assessment of a system. A further disadvantage of this approach is that it possibly does not reflect the hardware which is really used and it is possibly not possible to model all aspects of the real system, for example, hardware restrictions or unconsidered physical effects. Moreover, additional effort is required to develop a virtual prototype when the hardware product is already available. The second method is the use of the real hardware on an evaluation board or prototype. All effects which only take place in real hardware may thus be studied. The significant disadvantage of an evaluation on the basis of a prototype including real hardware is the lack of options for generating reproducible inputs. For some scenarios, it is possible to use a robot which may reproducibly carry out exactly the same motions. The possibilities for a robot to simulate the real motion are limited, however, in particular if human interaction plays a role. In other applications, for example in aircraft, it is nearly impossible to fly precisely the same maneuver twice to generate repeatable data.

There are numerous software suites and approaches to evaluate and simulate inertial sensors or inertial sensor systems. For example, using the so-called hardware-in-the-loop approach, the physical behavior of a sensor may be simulated and in this way the interaction with a real control system may be tested [6]. Commercially available sensor simulation PCs exist in particular for this purpose, which enable physical models of sensors to be simulated in a deterministic real-time simulation and the algorithms for processing the sensor data to be assessed. Other toolboxes enable data of the inertial sensors for the development and evaluation algorithms to be simulated. Examples are the Sensor Fusion and Tracking Toolbox of MATLAB® or the open-source project GNSS-INS-SIM. The mentioned toolboxes offer a software suite on a high abstraction level including algorithms and tools for the development, simulation, and assessment of sensor fusion algorithms for many different inertial sensors. The algorithms may be developed and evaluated in that either recorded or completely synthetic data are used. These approaches are completely software-based and are based on a high abstraction level. It is not possible to execute the developed algorithm directly on the sensor platform to study its performance, energy consumption, resource utilization, or real-time capability. The most typical and most modern approach for the simulation of an inertial sensor system is the virtual prototype simulation, which simulates the hardware used [5]. One essential advantage of this approach is that it does not require the actual hardware to assess the developed fusion algorithms. In the work [5], the inertial sensor is simulated via software in consideration of its physical properties, which may be extracted from the datasheet. The disadvantage of this approach is that the simulated model may only approximate the real hardware up to a certain point, however. It is not possible to study all properties of the system, in particular those which are not in the datasheet, for example. A further highly modern method for assessing the inertial sensors and the software which uses the sensors is the use of a prototype or an application circuit board including the real sensors, by which an assessment of the actual hardware in conjunction with the software is enabled. However, the significant difficulty results here, as described above, of exactly repeating the stimulus acting on the sensor and creating reproducible test conditions in this way.

[1] K. Wen, K. Yu, Y. Li, S. Zhang, and W. Zhang, "A new quaternion kalman filter based foot-mounted imu and uwb tightly-coupled method for indoor pedestrian navigation," IEEE Transactions on Vehicular Technology, vol. 69, no. 4, pp. 4340-4352, 2020.

[2] P. Koch, M. Dreier, M. Maass, M. Bohme, H. Phan, and A. Mertins, "A recurrent neural network for hand gesture recognition based on accelerometer data," in 2019 41st Annual International Conference of the IEEE Engineering in Medicine and Biology Society (EMBC), pp. 5088-5091, IEEE, 2019.

[3] N. Koksal, M. Jalalmaab, and B. Fidan, "Adaptive linear quadratic attitude tracking control of a quadrotor uav based on imu sensor data fusion," Sensors, vol. 19, no. 1, p. 46, 2019.

[4] A. Solanki, K. Prasad, R. Oreilly, and Y. Singhal, "Inertial mems test challenges," in International Mixed-Signals, Sensors and Systems Test Workshop, IEEE, 2011.

[5] J. Rudolf, D. Gis, S. Stieber, C. Haubelt, and R. Dorsch, "System power profiling for iot device firmware using runtime configurable models," in 2019 8th Mediterranean Conference on Embedded Computing (MECO), pp. 1-6, IEEE, 2019.

[6] B. A. Krishna and A. S. Pillai, "Digital sensor simulation framework for hardware-in-the-loop testing," in International Conference on Intelligent Computing, Instrumentation and Control Technologies, IEEE, 2017.

SUMMARY

It is an object of the present invention to provide a method using which the sensor-internal data processing may be tested, checked for errors, and/or optimized reproducibly.

A method in accordance with an example embodiment of the present invention, in contrast to the related art, not only permits data to be detected in real time, but rather also previously recorded data to be fed into the real hardware again and reproducible results to be obtained in this way. The positive aspects of the use of real hardware are combined with the reliable reproducibility of virtual prototypes by this approach. In an analogy to the concept "hardware-in-the-loop," this concept is referred to hereinafter as sensor-in-the-loop (SiL). The real hardware including an evaluation board or a prototype and also previously recorded data as an alternative input to the sensors may be used. The circuit board or the prototype is connected to a computer and communicates with a software program. This program may detect, record, and store for later use in particular both the sensor data (in particular in the form of raw data or preprocessed data) and the processed data. To obtain reproducible results, the system according to the present invention is capable of feeding previously detected data back into the sensor system. The sensor system processes the injected data and treats these data as if they had been generated by the sensor hardware. This enables the development, evaluation, and debugging in the real physical sensor repeatedly. This includes among other things the use of system resources, real-time capability, power consumption, or behavior in exceptional cases, but is not restricted thereto.

In accordance with an example embodiment of the present invention, the sensor system is, in particular, a so-called intelligent sensor (smart sensor) and, in addition to the at least one sensor unit, contains an integrated data processing unit, for example an application processor. The sensor unit is formed by the sensor in the narrower meaning, i.e., the element which converts a physical stimulus (e.g., acceleration, rotation, temperature, or pressure) into an electrical signal. The sensor unit may be in particular a microelectromechanical system (MEMS), for example, a microelectromechanical acceleration or rotation rate sensor. The electrical signal generated by the sensor unit is converted by an analog-to-digital converter into a digital signal, which is subsequently processed by the data processing unit. The data processing unit may be formed, for example, by a nonprogrammable digital logical circuit or by a programmable arithmetic unit such as a microprocessor. In particular, the digital signal generated by the converter may initially be preprocessed (for example filtered) by a hardware-implemented digital logic and stored in a register, from which the preprocessed data are subsequently read out by a microcontroller and further processed. The sensor system additionally includes a memory unit, which may be designed as a random-access memory (RAM) and/or may be expanded or replaced by a read-only memory (for example in the form of a flash memory). The sensor unit, the data processing unit, and the memory unit may be provided in various integration levels, in particular as a "system-on-chip" (SoC), as a "system-in-package" (SiP), or as a "system-on-module" (SoM), the concept according to the present invention being similarly applicable for all of these types of integration and their combination.

In accordance with an example embodiment of the present invention, the sensor system may include more than one sensor unit, in particular, the various sensor units may be designed for different physical stimuli. The individual sensor units may measure, for example, accelerations or rotation rates with respect to one or multiple axes and the data may subsequently be combined and processed by the data processing unit (multi-sensor data fusion). The sensor system is in particular an intelligent sensor hub. The singular is predominantly used hereinafter with respect to the sensor unit, a plurality of sensor units also being implicitly included, however. The sensor unit and the data processing unit are connected in particular via an interface (inter-circuit communication interface), for example, a serial peripheral interface (SPI), or an "inter-integrated circuit" data bus ($I^2C$ or I2C). In addition, one or multiple interrupt lines may be situated between sensor unit and data processing unit, which enable a communication with low latency time (for example for events such as the presence of new sensor data). The sensor system additionally includes one or multiple interfaces to pass on the processed data to an external device. This interface may be implemented, for example, via SPI, I2C, or by a universal asynchronous receiver transmitter interface (UART), and may be supplemented by one or multiple further interrupt interfaces.

Advantageous embodiments and refinements of the present invention may be inferred from the description herein with reference to the figures.

According to one advantageous embodiment of the method according to the present invention, the output data generated in the processing step are read out by the external processor unit, a change of the data processing unit taking place in a subsequent change step, the recorded sensor data being fed back into the data processing unit in at least one further injection step, and further output data generated in a further processing step being read out by the external processor unit, a comparative evaluation of the functional and extra-functional results of the processing steps being subsequently carried out. In particular, the change of the data processing unit is carried out by a change of the software executed on the data processing unit. In this way, the data processing unit or the software of the data processing unit may be checked for errors (debugging). After the at least one injection step, in particular additional iterations may take place in which one or multiple further injection steps are executed. Furthermore, it is possible to evaluate or optimize the processing speed and/or the electric power consumed during the processing or other system parameters.

Preferably, the comparative evaluation of the functional results of the processing steps includes a comparison of the first and second output data and/or the comparative evaluation of the extra-functional results of the processing steps includes a comparison of the power consumption and/or the response time and/or the throughput and/or memory demand and/or the reliability and/or the energy.

According to one advantageous embodiment of the present invention, the state of the data processing unit, in particular the state of at least one memory content of the data processing unit, is monitored during the processing step. A possibility advantageously results therefrom of accurately monitoring the data processing, analyzing it, and debugging it.

According to one advantageous embodiment of the present invention, the sensor system includes at least one further sensor unit, the data processing unit being configured to process the sensor data output by the sensor unit and further sensor data output by the further sensor unit by data fusion to form the output data, the further sensor data being read out and recorded from the sensor system in the recording step by the external processing unit and the recorded further sensor data being fed in the injection step by the external processor unit into the internal data processing unit. This embodiment corresponds to an expansion to sensor systems including multiple sensors, in particular to sensor systems which are based on a multisensor data fusion approach. The design options described with respect to a single sensor are transferred similarly.

According to one advantageous embodiment of the present invention, the internal data processing unit includes a programmable microprocessor and the system software of the microprocessor preferably provides a function for reading out the sensor data via a communication interface of the sensor system and particularly preferably a function for injecting the recorded sensor data. The firmware which runs on the application processor or μC has to be adapted to implement the provided SiL approach. This could be carried out by the configuration of a library or a collection of functions which handle the recording and the injection of the data of the sensor. These functions are preferably similar to the original functions of the sensor programming interface (application programming interface, API), which are used to read data of a connected sensor using a communication interface such as SPI or I2C or for receiving data. The sensor software has to implement the interface between the actual sensor, the application processor, and the GUI. It is crucial that the time behavior of the modified firmware functions is similar to the time behavior of the original functions or corresponds thereto.

A variety of physical interfaces and communication protocols come into consideration for the design of the communication interface between the application processor of the sensor and the computer on which the graphical user interface runs. Depending on the desired number of different sensor types and sampling rates of each individual sensor, criteria such as the sequence of the data, reliability, throughput, and latency are to be taken into consideration. In accordance with an example embodiment of the present invention, it is absolutely required in particular that the sequence of the data packets (sensor data) remains the same during the transfer. The reliability of the interface ensures that precisely the same data are used in the same sequence during the transfer and during each run of the sensor using the artificial data. The throughput of the interface has to be higher than the actual sensor data throughput since it may be necessary to transmit additional pieces of information such as control data or calculation results. Furthermore, the latency time has to be low enough to transfer the sensor data for the provided sampling rate in real time. It is still possible under certain circumstances to use an interface which does not meet all of these requirements. In such a case, however, it is then necessary to manually implement the corresponding requirements on a higher protocol level.

According to one advantageous embodiment of the present invention, the sensor data, the output data, and/or the further output data are graphically displayed by the processing unit, processing, particularly preferably filtering of the sensor data, preferably being carried out before the graphic display. This part of the SiL concept relates to the graphical user interface (GUI). The GUI permits the sensor-sensor data to be recorded from the corresponding sensor in the desired data rate. After the data have been recorded, they may be modified or used directly for renewed injection to test different variants of the sensor firmware using reproducible data patterns. The visualization of the recorded data and the corresponding calculation results are preferably also possible via the GUI. These capabilities enable an engineer to develop, improve, or evaluate software in a simple and deliberate manner.

According to one advantageous embodiment of the present invention, the sensor unit includes an analog-to-digital converter and the internal data processing unit includes a logic circuit implemented by hardware, the recorded sensor data being fed into a data path after the analog-to-digital converter and before the logic circuit or being fed into a register of the logic circuit.

A further subject matter of the present invention is a sensor system and a system, in accordance with example embodiments of the present invention. The same design options and advantages result for the sensor system and the system which were described with reference to the method according to the present invention.

According to one advantageous embodiment of the system according to the present invention, the sensor system and the processor unit are connected to one another via a debugging probe, the debugging probe being configured to read out and feed in the sensor data.

Exemplary embodiments of the present invention are shown in the figures and explained in greater detail in the description below.

DETAILED DESCRIPTION OF EXAMPLE EMBODIMENTS

Figure 1C:
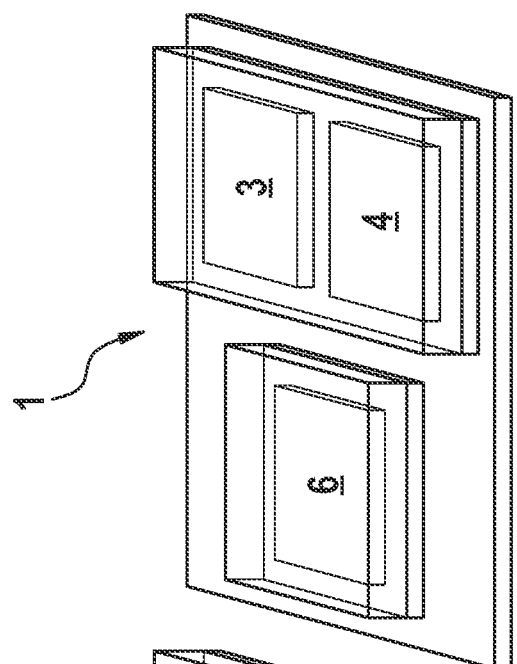
FIGS. 1A, 1B, and 1C show various integration levels of intelligent sensors.
Figure 1B:
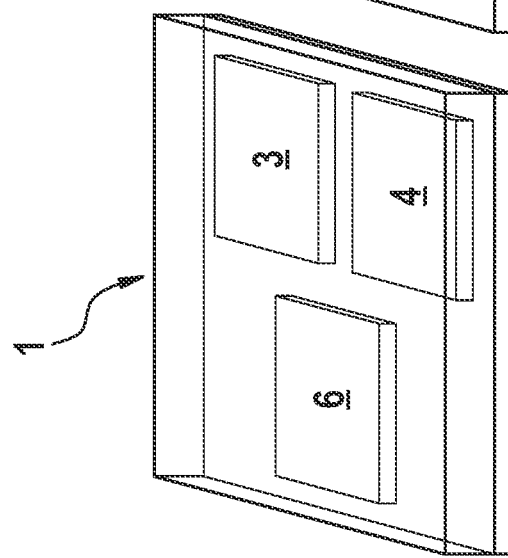
Figure 1A:
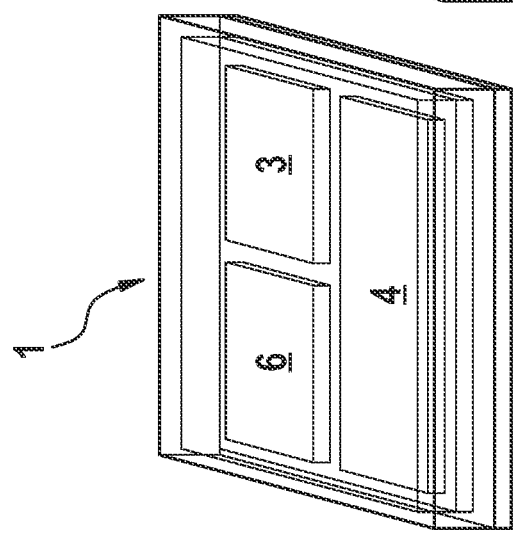

Intelligent sensors may be classified into three different integration levels, which are shown in FIGS. 1A-1C. The version having the highest integration is the SoC (system-on-chip), shown in FIG. 1A. All components 3, 4, 6 are placed on the same die of a semiconductor wafer. In the case of an intelligent sensor, there are at least one MEMS element 6, an application processor 3, and a memory element 4 (primarily RAM). The second integration level in FIG. 1B shows a system-in-package (SiP). Some components are placed in the same housing and are connected to one another via lines. MEMS element 6, microcontroller 3, and flash memory 4 are located on dedicated dies, but in the same housing. The lowest integration level is offered by the system-on-module (SoM) implementation of a smart sensor shown in FIG. 1C. Each system component 3, 4, 6 has its own housing and all components 3, 4, 6 are placed on the same circuit board. The sensor-in-the-loop concept according to the present invention is suitable for all three types of smart sensor implementations. Combinations of the described types of integration are also possible.

Figure 2:
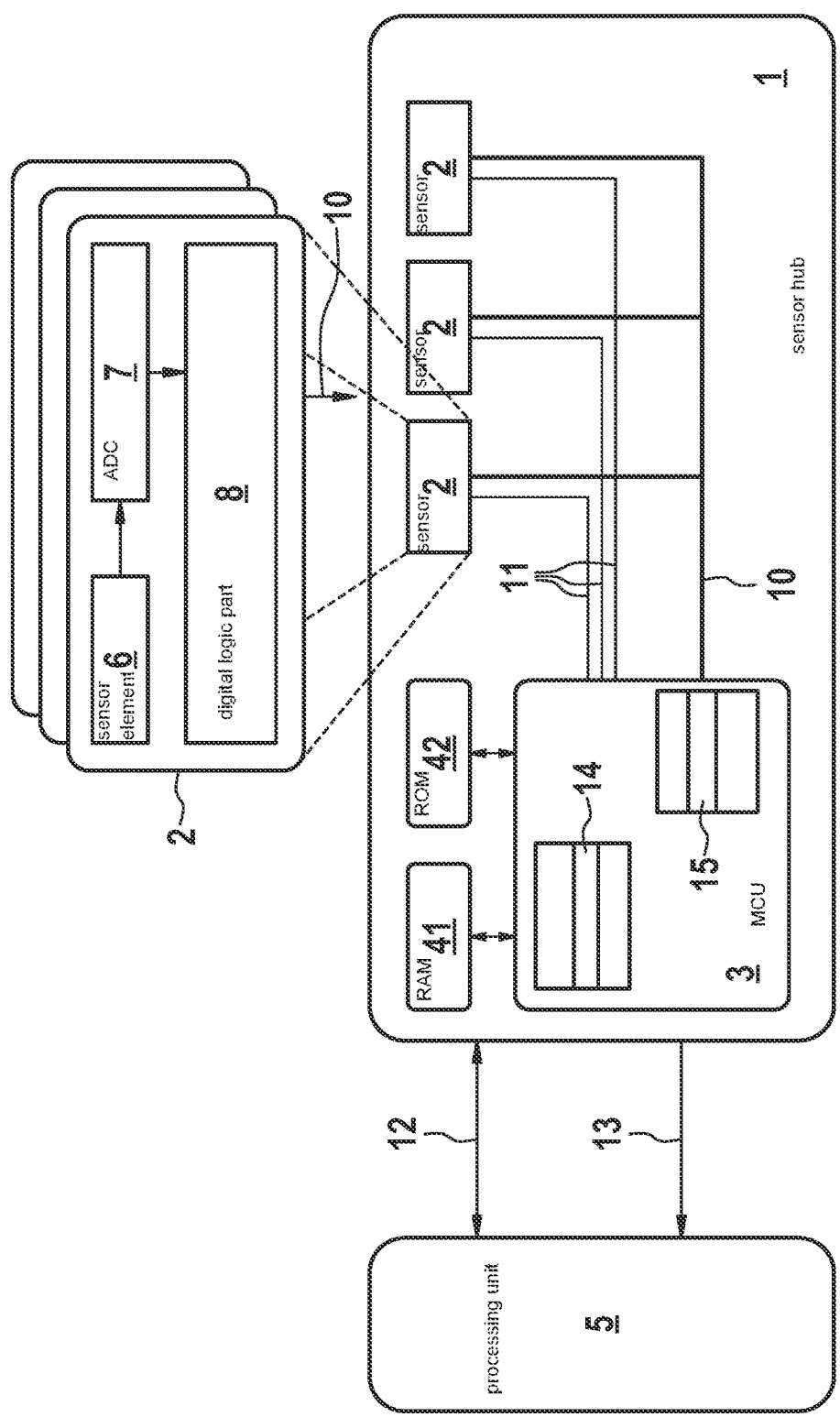
FIG. 2 shows a typical structure of a smart sensor hub.

A typical smart sensor hub 1 is shown in FIG. 2. It is generally made up of three components, in which the integration level of the individual components may vary from type to type. The first part is formed by sensors 2 (in the example shown these are three individual sensors 2). These may be, for example, inertial sensors such as acceleration sensors or rotation rate sensors. Other sensor types, for example, temperature or pressure sensors, are also often used in sensor hubs 1. Such a sensor 2 may generally in turn be subdivided into three subcomponents 6, 7, 8. The first component is actual sensor element 6, which is often manufactured in MEMS technology. Analog-to-digital converter (ADC) 7 converts the measured physical variable into a digital value which is used inside digital logic part 8 of sensor 2. The digital value may be preprocessed by filters in digital logic 8, for example, using a low-pass filter or averaging of a certain number of values. After the preprocessing, the data are stored in registers and may be requested by data processing unit 3, typically a microcontroller 3 (microcontroller unit, MCU) via communication interface 10. There are a variety of inter-circuit communication interfaces which are used for connecting components in a SiP. A serial peripheral interface (SPI) or inter-integrated circuit (I2C) is often used here. In addition to communication interface 10, in some sensors an interrupt line 11 is also connected to MCU 3 to achieve a low latency time during the messaging about events, such as new sensor data. MCUs 3 used in smart sensor hubs 1 are generally energy-efficient µC or application-specific proprietary processing units. MCU 3 may be expanded by additional memory units, which are designed as RAM 41 or ROM 42 and are connected via a standard communication interface or a dedicated memory interface. MCU 3 accepts the data retrieved via interface 10 as data fields or internal register values 15, carries out various operations using these data, and stores processed data 14 in memory element 41. On the outside, sensor hub 1 includes an interface 12 (e.g., SPI, I2C, UART) to transfer the processed data to external processing unit 5 (application processor, AP). In addition, an interrupt interface 13 may be situated between sensor hub 1 and processor unit 5. The use of an MCU 3 within a sensor hub 1 enables developers to test all existing sensors 2 at one point and to carry out preprocessing of these data before they are transferred to AP 5. There are numerous possibilities for manipulation of the sampled data in MCU 3. The collected data may be compressed or filtered, in addition the developer may generate so-called virtual sensors, for example, for step recognition, absolute orientation, or gesture recognition.

Figure 3:
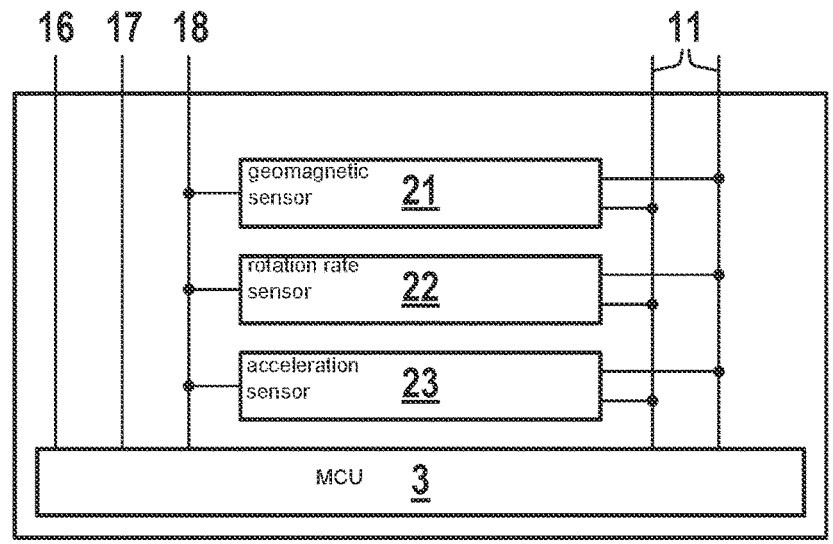
FIG. 3 shows components of an intelligent sensor for a possible implementation of the system according to an example embodiment of the present invention.

FIG. 3 shows components of an intelligent sensor 1 for an exemplary implementation of the system according to the present invention. The applicability and the advantages of the SiL concept according to the present invention may be demonstrated on the basis of the prototype described hereinafter. For the exemplary implementation, an intelligent programmable sensor 1 is used, which combines a three-axis 14-bit acceleration sensor 23, a 16-bit rotation rate sensor 22, and a three-axis geomagnetic sensor 21 with a 32-bit microcontroller 3.

Figure 4:
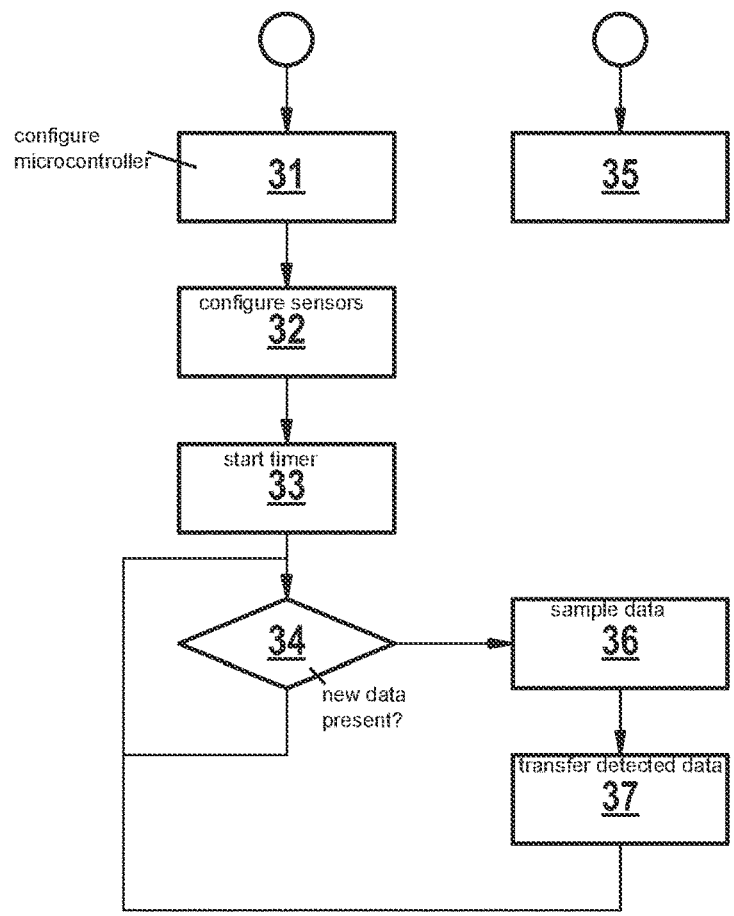
FIG. 4 shows a flowchart of exemplary software of the data processing unit, in accordance with the present invention.

FIG. 4 shows the structure of the firmware of data processing unit 3 of the exemplary implementation. The illustrated example is a simple implementation which configures the three included sensors 21, 22, 23 of the system shown in FIG. 3. In first step 31 of the configuration phase, initially microcontroller 3 is configured, in subsequent step 32, sensors 21, 22, 23 are configured, and finally, in step 33, the timer is started, so that a cyclically repeated query 34 is carried out in which the firmware samples individual sensors 21, 22, 23 at a configurable data rate. If new data are present, the data are sampled in step 36 and the detected data are subsequently transferred in step 37 using the universal asynchronous receiver transmitter interface (UART) of µC 3. This exemplary implementation was expanded by an SiL library, which supplements the required C functions with the SiL functionalities. This library offers functions for transmitting the retrieved sensor data via the SiL interface to the GUI of processor unit 5 for recording and postprocessing. In addition, it is possible to inject the previously recorded or artificially generated data back into the running sensor. For the implementation, a 1 kB buffer was used for each of the three sensors 21, 22, 23. The size of this buffer is dependent on the data rate and may be much smaller in most applications.

Figure 5:
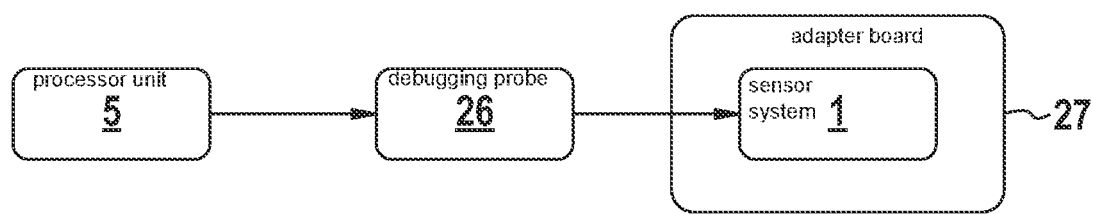
FIG. 5 shows the components of one specific embodiment of the system according to the present invention, in which the processor unit is connected to the sensor via a debugging probe.

FIG. 5 shows a specific embodiment of the system according to the present invention in which a debugging probe 26 is used for the communication between external processor 5 and sensor system 1 situated on an adapter board 27. Probe 26 is connected to host PC 5 via a USB interface and is connected using the 20-pin pin header on the breakout circuit board to the "serial wire debug interface" (SWD) of sensor system 1. A real-time transfer interface is used as the communication interface between the running firmware of sensor system 1 and the process on PC 5, which controls the data flow and visualizes the data. The associated transfer protocol is integrated into hardware debugger 26, which may be used by a firmware developer to debug the sensor firmware. This means that no additional hardware is required for the implementation of the SiL functions.

To check the entire SiL process during the debugging of sensor target 1, a plug-in 25 of an open-source development environment (integrated development environment, IDE) was used, which permits all required SiL functions from the IDE to be used for the firmware development. The communication with the plug-in takes place via a TCP socket of debugging probe 26. The use of the standard socket implementation in Java enables the application to control the data flow of the SiL packets for the sensor application. After receiving the data from the socket, debugger 26 uses a real-time interface for communication with sensor 1 itself.

Figure 6:
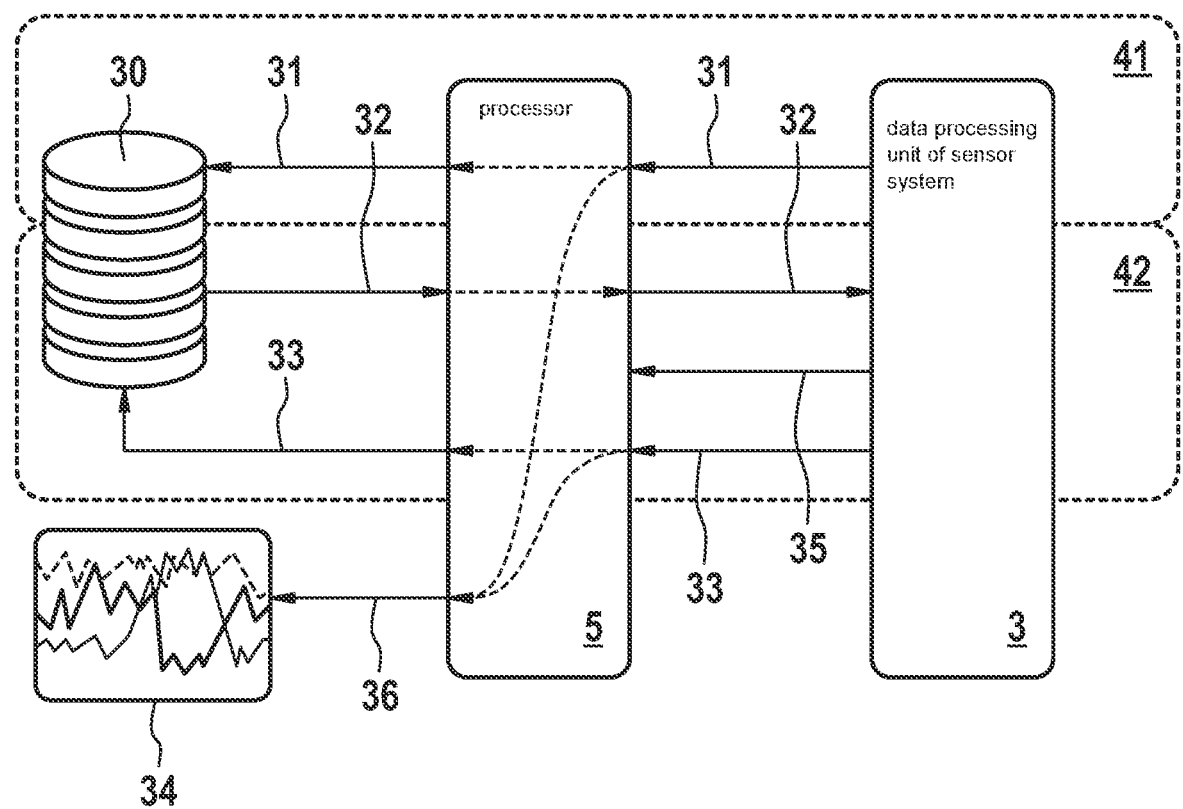
FIG. 6 shows the data flow during the reading out and feeding in of the data.

FIG. 6 shows the data flow during the reading out and feeding in of the data. Upper part 41 represents the recording of the sensor data, while lower part 42 represents the injection of the recorded sensor data. In the illustrated exemplary case, data processing unit 3 of sensor system 1 is configured to combine sensor data from multiple sensors via data fusion and to output the processed data. In this implementation of the method according to the present invention, sensor system 3, processor unit 5, memory unit 30 of the processor unit, and graphical user interface (GUI) 34 communicate in the following way: The sensor data are initially transferred from data processing unit 3 of sensor system 1 to processor unit 5 and recorded thereby in memory unit 30 (this part of the data flow is indicated by arrows 31). Subsequently, the stored sensor data are retrieved again by processor 5 and fed into data processing unit 3 (indicated by arrows 32). The data processing unit signals that it has received the data (arrow 35) and carries out the data fusion on the basis of the sensor data in a data processing step. The fused data are transferred to processor 5 and stored thereby (arrows 33). Processor 5 is now capable of displaying both the sensor data and the fused data (arrow 36) via graphical user interface 34. In this way, for example, the algorithm for processing and data fusion executed on data processing unit 3 may be debugged, tested, or optimized.

The method according to the present invention and the sensor-in-the-loop architecture give a developer the possibility of injecting previously recorded data from an intelligent sensor 1 (in particular an inertial sensor) back into sensor 1, so that the sensor software may be evaluated and tested using reproducible results directly on the hardware. This approach is made up of three architecture layers and may be implemented on practically any intelligent sensor hardware.

Figure 7A:
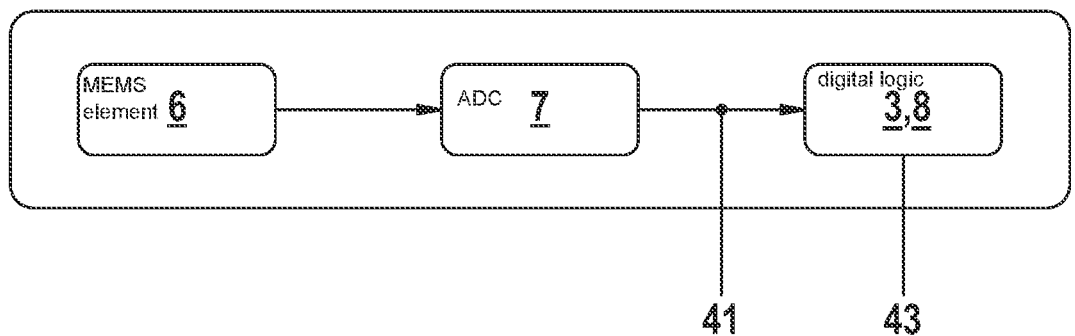
FIGS. 7A and 7B shows one possible implementation of the method according to the present invention in sensors without a microcontroller.
Figure 7B:
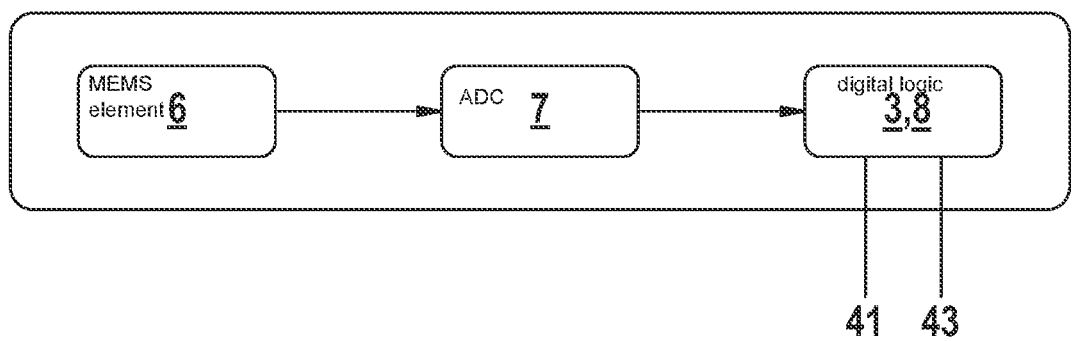

FIGS. 7A and 7B show one possible implementation of the method according to the present invention in sensors without a microcontroller. The signal path leads from the micro-electromechanical system (MEMS) via an analog-to-digital converter 7 to a digital logic unit, i.e., to a logic circuit 8 implemented by hardware, which represents data processing unit 3 in this implementation, into which recorded sensor data are fed. Injection interface 41 is situated, in the example from FIG. 7A, in the data path after converter 7 and before digital logic 8. Alternatively thereto, injection interface 41 may lead directly into digital logic 8 itself, as shown in FIG. 7B, and the injection may take place in particular by writing in a register. In both examples, digital logic 8 may additionally include a debugging/checking interface 43.

What is claimed is:

1. A method for checking, evaluation, and/or error diagnosis of a sensor system, the sensor system including at least one sensor unit and an internal data processing unit, the sensor unit being configured to output sensor data as a function of a physical stimulus and the internal data processing unit being configured to process the sensor data output by the sensor unit to form output data, the method comprising:
reading out the sensor data output by the sensor unit from the sensor system, and recording the read out sensor data by an external processor unit in a recording step;
feeding by the external processor unit the recorded sensor data into the internal data processing unit in an injection step; and
processing the fed-in sensor data by the internal data processing unit in a processing step.

2. The method as recited in claim 1, further comprising:
reading out by the external processor unit first output data generated in the processing step;
after the reading out of the first output data generated in the processing step, changing the internal data processing unit in a following change step;
after the change step, feeding the recorded sensor data back into the internal data processing unit in at least one further injection step, and
reading out, by the external processor unit, further output data generated in a further processing step; and
after the reading out of the further output data, subsequently carrying out a comparative evaluation of the functional and/or extra-functional results of the processing step and further processing step.

3. The method as recited in claim 2, wherein: (i) the comparative evaluation of the functional results of the processing step and further processing step includes a comparison of the first and further output data, and/or (ii) the comparative evaluation of the extra-functional results of the processing step and further processing step includes a comparison of power consumption and/or response time and/or throughput and/or memory requirement and/or the reliability and/or energy.

4. The method as recited in claim 2, wherein the sensor data, the first output data, and/or the further output data are visualized by the processor unit.

5. The method as recited in claim 4, wherein a filtering of the sensor data is carried out before the visualizing.

6. The method as recited in claim 1, wherein a state of the internal data processing unit is monitored during the processing step.

7. The method as recited in claim 1, wherein a state of at least one memory content of the internal processing unit is monitored during the processing step.

8. The method as recited in claim 1, wherein the sensor system further includes at least one further sensor unit, the internal data processing unit being configured to process the sensor data output by sensor unit and further sensor data output by the further sensor unit, by data fusion to form the output data, the further sensor data being read out from the sensor system and recorded by the external processor unit in the recording step, and the recorded further sensor data being fed by the external processor unit into the internal data processing unit in the injection step.

9. The method as recited in claim 1, wherein the internal data processing unit includes a programmable microprocessor.

10. The method as recited in claim 9, wherein system software of the microprocessor provides a function for reading out the sensor data via a communication interface of the sensor system and provides a function for injecting the recorded sensor data.

11. The method as recited in claim 1, wherein the sensor unit includes an analog-to-digital converter and the internal data processing unit includes a logic circuit implemented by hardware, the recorded sensor data being fed into a data path after the analog-to-digital converter and before the logic circuit or being fed into a register of the logic circuit.

12. A system, comprising:
a sensor system including at least one sensor unit and an internal data processing unit, the sensor unit being configured to output sensor data as a function of a physical stimulus and the internal data processing unit being configured to process the sensor data output by the sensor unit to form output data; and
a processor unit configured to read out and record the sensor data output by the sensor unit from the sensor system, the processor unit furthermore being configured to feed the recorded sensor data into the internal data processing unit and the internal data processing unit being configured to process the fed-in sensor data.

13. The system as recited in claim 12, wherein the sensor system and the processor unit are connected to one another via a debugging probe, the debugging probe being configured to read out and feed in the sensor data.

* * * * *